United States Patent Office 3,420,585
Patented Jan. 7, 1969

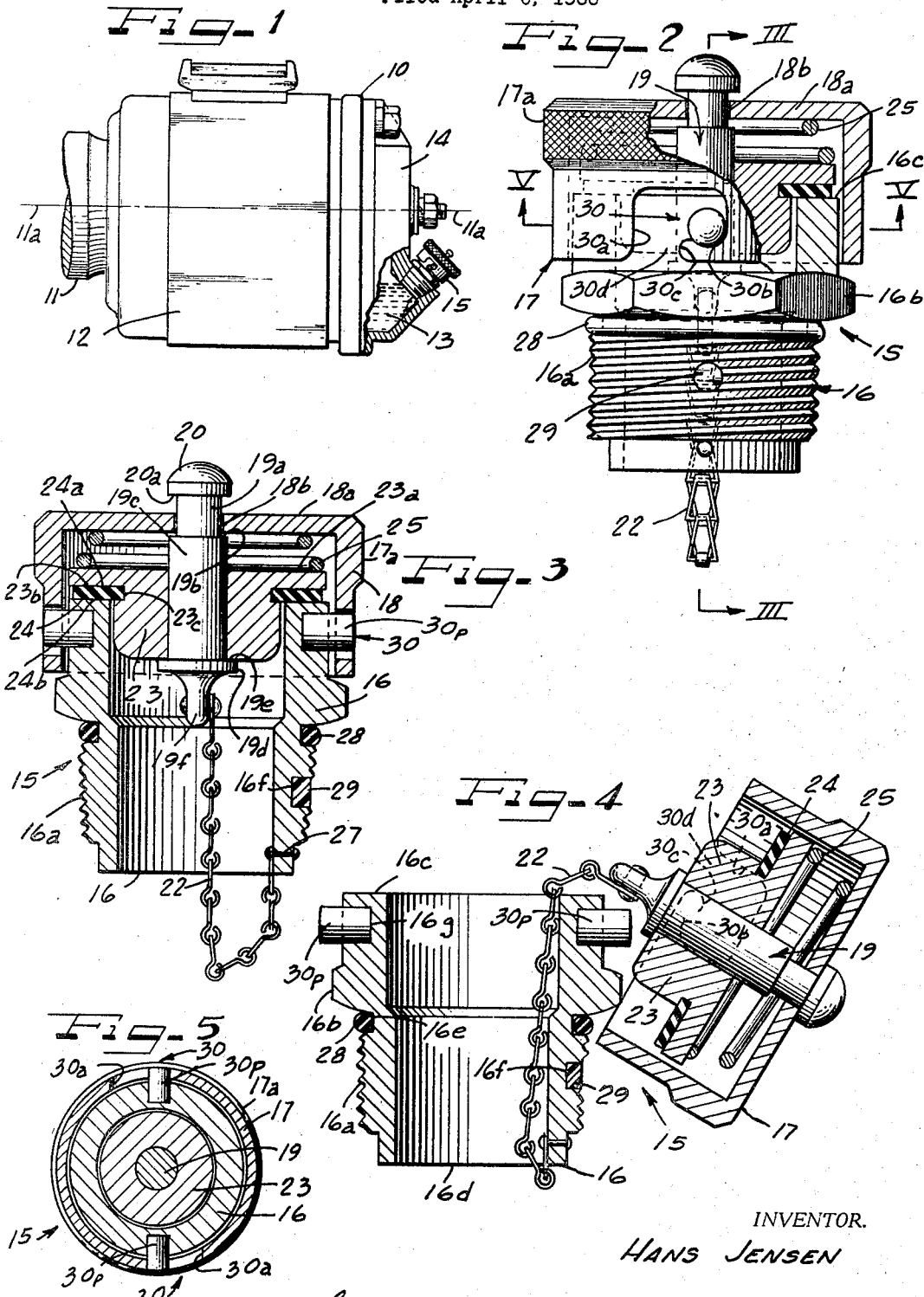

3,420,585
OIL HOLE COVER
Hans Jensen, Wheeling, Ill., assignor to Gits Bros. Mfg. Co., Chicago, Ill., a corporation of Delaware
Filed Apr. 6, 1966, Ser. No. 540,771
U.S. Cl. 308—44    3 Claims
Int. Cl. F16c *33/66;* F16c *35/00*

ABSTRACT OF THE DISCLOSURE

An oil hole cover having an externally threaded body member with a friction plug inset in the threaded area adapted to be threaded into an oil hole in a housing, the body member defining an oil passageway and closable by a cap which has a pin projecting through a closed end thereof, the pin carrying a plunger adapted to close the oil passageway, and a spring acting between the closed end of the cap and the plunger to urge the plunger and a sealing gasket carried thereby against the open end of the body member.

---

The present invention relates to a new and improved oil hole cover assembly and more particularly to a new and improved oil hole cover for use in combination with a railroad journal box.

In some environments of use, such as that of the railroad journal box which must be filled periodically with oil, an oil hole cover assembly is exposed to extreme variations of temperature, and moisture, dirt, shock, vibration, jarring and other abuse. Despite these adverse conditions, such a cover must be adaptable for easy removal and replacement in all types of weather while fulfilling its primary function of preventing leakage of oil.

It is a general object of this invention to provide a new and improved oil hole cover.

It is a specific object of this invention to provide such a cover for use with a railroad journal box which is easily opened and closed under varying conditons and yet, when closed, provides a secure seal against oil leakage from the oil hole despite the adversities and extremities of its environments of use.

The organization and manner of operation of the invention, together with further objects and advantages thereof, may best be understood by reference to the following description taken in connection with the accompanying drawings, in the several figures of which like reference numerals identify like elements, and in which an exemplification of the invention is illustrated.

FIG. 1 is a side plan view of a railroad journal box, with parts broken away to show interior parts, incorporating an oil hole cover constructed in accordance with the principles of the present invention;

FIG. 2 is a side plan view of an oil hole cover of FIG. 1, with parts broken away to show interior parts;

FIG. 3 is a sectional view of the oil hole cover as seen from line III—III in FIG. 2;

FIG. 4 is a view, similar to that of FIG. 3, with the oil hole cover in a moved position; and FIG. 5 is a transverse sectional view as seen from the line V—V of FIG. 2 in reduced scale of the oil hole cover.

Referring now to FIG. 1, there is depicted a railroad journal box 10 which in use in mounted juxtaposed to a railroad wheel for receiving a wheel axle 11. Journal boxes of the general type of the box 10 are conventionally mounted on the outer side of the undercarriage of the railroad car beneath its major body, approximately one to two feet above the rails. The box 10 is thus exposed to the elements, jars and hazards experienced by a railroad car undercarriage. The box 10 includes the low friction bearings of the axle 11 within its basic housing 12.

The bearings are lubricated in this case, by means of oil 13 which fills the lowermost portion of the box 10. During continuous use, the oil 13 must be replaced, in whole or in part, at various intervals to prevent overheating of the bearings and housing 12.

In accordance with the present invention, an oil hole cover 15 is provided, mounted at approximately 45° to the normally horizontal axis 11a of the axle 11 and box 10 at the outward facing surface 14 of the housing 12 just below the axis 11a. When the journal box is filled with oil, the oil level is extended up to the lower side lid of the body of the cover. The oil cover 15 is positioned so that when the oil 13 is at its correct or full level it is visible to one looking into the oil hole. With this arrangement, it is impossible or very difficult to overfill the housing 12 with oil as any excess oil will normally spill out of the cover 15 in its open or filling condition.

The oil hole cover, as better depicted in FIG. 2, comprises a generally cylindrically shaped lower portion or body 16 defining an oil passageway through the housing 14 and an upper portion or cap 17 for selectively preventing flow through the passageway. The body portion 16 includes an external threaded portion 16a extending along a longitudinal section of its outer surface for affixing the body 16 into an internal threaded oil hole formed in the housing 12. The body 16 further includes an outstanding octagonal flange 16b above the threaded portion 16a for receiving a wrench or other tool which may be used in affixing the cover 15 to the housing 12, and a cap-mating end edge wall 16c of generally circular configuration. The cap 17 includes an outstanding scored encircling gripping portion 17a formed about its upper edge to facilitate the manual gripping of the cap 17 in opening and closing the cover 15. Bayonet locking means 30 is defined by the cap 17 and body 16 for releasably securing the cap 17 to the body 16.

As depicted in FIGS. 2–5, the cap 17 comprises a cylindrically shaped outer shell 18 enclosed across one end by a generally circular contiguous wall 18a. The end wall 18a of the cap 17 has a circular opening or hole 18b at its center for receiving a portion of a generally cylindrically shaped pin 19 which is mounted with its axis normal to the plane of the end wall 18 along the cylindrical axis of the shell 18. The pin 19 has a section 19a of decreased diameter extending through the opening of the wall 18a. The diameter of section 19a is slightly less than that of the hole 18b to allow sliding movement therebetween. A collar 20 is affixed to the pin 19 and has a greater diameter than the hole of the wall 18a which serves to define a stopper plane or abutment 20a above one end of the pin 19 above the outer surface of the wall 18a. The pin 19 furthermore has an increased diameter within the cavity formed by the outer shell 18, and a similar abutment 19b facing the inner surface of the wall 18a. The abutments 19b and 20a are spaced so as to allow the pin 19 to travel relative to the wall 18a over the surface 19a. The pin 19 has a cylindrical outer surface 19c of increased diameter extending from the abutment 19b along its cylindrical axis and terminating in an outstanding flange 19d forming an abutment 19e in a plane transverse and normal to the axis of the pin 19. The pin 19 further includes a nipple extension 19f beyond the flange 19d along its cylindrical axis for affixing thereto one end of a flexible restraining means comprising a chain 22. Affixed to and mounted about the surface 19c is a generally annular shaped plunger 23 which is rigidly affixed to and in sealed leakproof contact with the pin 19 to form one plunger unit. The plunger 23 extends for approximately two-thirds of the length of the surface 19c and includes a circular planar upper surface 23a having a diameter slightly less than the inside diameter of the shell 18. Underneath the outer periphery of the surface 23a of the plunger 23, is defined a surface 23b, lying in the plane normal to the central axis of the pin 19 and the plunger 23. The surface 23b extends into and forms part of a generally annular depression 23c which encircles the plunger 23 adjacent the surface 23b. The surface 23b and the depression 23c serve to receive and entrap the inner edge of a gasket 24 which is of generally annular shape and is positioned about a plane normal to the axes of the pin 19 and the plunger 23 to have one surface 24a lying against and supported by the surface 23b of the plunger 23 and forming an outwardly facing gasket surface 24b for mating with the upper edge wall 16c of the body 16 to form a seal therewith. Biasing means 25, comprising a coiled spring 25 mounted between the inner surface of the wall 18 and the surface 23a of the plunger 23 is supplied for biasing the plunger 23 away from the wall 18a. The biasing means 25 serves two functions, the first of which is to bias the plunger 23 and thus the gasket 24 against the upper edge surface 16c of the body 16 so as to achieve the proper seal between the cap 17 and the body 16, and the second and additional function of which is to bias the cap or outer shell 17 so as to maintain bayonet lock means 30 locked when the cover 15 is in its closed position (FIGS. 1–3). Flexible restraining means or chain 22 is affixed at its one end away from the nipple 19f by any convenient means such as a rivet 27 to the interior side wall of the body 16 near its bottom edge 16d. The chain functions to retain the cap 17 in the immediate vicinity of the body 16 when the cover 15 is in the open position as depicted in FIG. 4. The body 16 further includes outside sealing means including an O-ring 28 which is positioned within an encircling depression 16e in the outer side surface of the body 16 between the threaded portion 16a and the tool-receiving octagonal flange 16b. The O-ring 28 serves to form a leak-proof seal between the outer surface of the body 16 and the housing 12.

Also provided to improve the mating of the body 16 with the housing 12, as best shown in FIGS. 2–4, is one or more frictional engagements 29. The engagements 29 comprise a relatively small round nylon plug which is inserted within a round depression 16f formed in the outer surface of the body 16 at the threaded portion 16a. The depth of the depression 16f and the thickness of the plug 29 are so apportioned as to have the plug 29 extend outwardly so as to frictionally engage the interior threads of the housing 12 when affixed thereto. The frictional engaging plug 29 thus serves to retain the body 16 affixed in the housing 12 despite the twisting in removal or affixing of the cap 17 on the body 16.

The bayonet locking means 30 comprises two cutout portions 30a in the side walls of the cap 17 at opposite ends of a common diameter 180° apart as best depicted in FIGS. 4 and 5. Two bayonet pins 30p are rigidly affixed in depressions 16g formed 180° apart in the outer surface of the body 16 between the top edge 16c and the octagonal flange 16b. The pins are positioned 180° apart at opposite ends of a cylindrical diameter of the body 18 and project outwardly therealong a sufficient extent to enter and engage with the cutout portions 30a, the cutout portions 30a and the conformingly shaped cap 17 when the cover 15 is in its closed state. The shape of the cutout portions 30a is best shown in FIG. 2 and includes a curving cradle 30b conforming to the shape of the pin 30p which moves to leave the cutout portion via a downward opening exit 30d.

In closing the oil cover 15, the cap 17 is manually placed on the body 16 with the plunger entering the interior portion of the body 16 and the open edge end 17e of the cup 17 about the top edge wall 16c of the body 16. The edge 17 makes contact with the outstanding pin 30p. The operator then rotates the cap until the pin 30p enters the opening 30d of the cutout 30a and the cap moves further downward on the body 16. With a slight downward movement the gasket 24 makes contact with the upper edge surface 16c of the body 16 and with the continued progress of the gasket 24 the plunger 23 is restrained. With further downward pressure the spring 25 is fully compressed and the shell 18 moves further down on the body 16 to its maximum position. In this position, the pin 30p may ride over the ridge 30c. A slight twist of the cap 17 accomplishes this and with the releasing of the cap 17, the pin 30p enters and is held in the saddle-shaped surface 30b of the cutout 30a (FIGS. 2 and 3).

As will now be apparent a new and improved oil hole cover has been described which is especially useful in conjunction with a railroad journal box and is easily opened and closed under varying conditions and when closed provides a secure seal against oil leakage despite adverse and extreme conditions during use.

I claim as my invention:

1. In combination:
    a railroad journal box for housing the bearings for a railroad wheel axle and adapted to entrap a quantity of lubricating oil for the bearings; and
    an oil hole cover apparatus mounted with its axis at approximately 45° to the axis of the axle and affixed to provide a selectively closed and open oil passageway through the wall of the journal box for filling said journal box with the lubricating oil, said hole cover apparatus comprising:
    a generally cylindrical body defining an oil passageway into said journal box including an external threaded portion extending along a longitudinal section of its outer surface threadably engaged with internal threads provided in the oil hole of the box for affixing said body to said box, said threaded portion including at least one frictional engagement each comprising a round nylon plug which is positioned in a round depression formed in said body and extending radially outwardly so as to frictionally engage the interior threads of the oil hole, said body further defining an outstanding affixing tool-receiving flange, and having an end edge of generally circular configuration; and
    a cap for selectively preventing flow through the passageway of said body, said cap being formed to fit on said body and comprising a generally cylindrically shaped shell closed across one end by a generally circular wall defining a centrally located hole and forming with said shell a hollow space, said space having a plunger unit positioned therein, said plunger unit including an annularly shaped gasket for mating against said circular end edge of said body when said cover is in its closed state, said unit further including a pin positioned along the cylindrical axis of said shell and extending through the hole defined by the circular wall of said shell, said pin including a stopper surface for preventing excessive movement of said unit relative to said shell, and biasing means comprising a spring positioned between said plunger unit and said circular wall of said shell for biasing apart said circular wall and said plunger;
    bayonet locking means for securing said cap to said body in the closed state, said means comprising a pair of oppositely disposed, at opposite ends of a cylindrical diameter normal to the cylindrical axis of said body, outstanding bayonet pins affixed to the outer surface of said body, and a pair of oppositely disposed cutout portions defined in said shell for allowing said pins to enter, and for releasably captivating said pins in cooperation with said biasing means; and
    cap restraining means comprising a chain having two ends and being affixed at one end to the interior surface of said body and at the other end to said plunger unit of said cap.

2. An oil hole covering assembly comprising: a body of generally cylindrical shape with an oil passageway therethrough, the passageway being disposed about the cylindrical axis of the body, the body including an externally threaded portion for threading the body into and affixing the body to a housing, said threaded portion including a depression formed therein to receive a frictional engagement, said body further defining an encircling depression for receiving an O-ring seal and having a generally circular end edge for mating with a part of a cap when said assembly is in a closed state, said body including a frictional engagement in said depression formed in said threaded portion and further including an O-ring in said encircling portion, a cap for selectively closing and opening the oil passageway of said body, a spring-urged plunger carried by said cap for overlying the body to seal said oil passageway, and said body and cap defining bayonet locking means loading the plunger against the body and releasably affixing the cap on the said body for stopping oil flow through the passageway of said body.

3. An oil hole cover assembly comprising: a generally cylindrical body member having a bore therethrough defining a passageway, a portion of said body externally threaded, a tool receiving flange on said body, a friction plug carried by said body in the area of said external threads, an O-ring seal carried by said body adapted to seal an internally threaded bore receiving said body except through said passageway, a cap adapted to fit over a free end of the said body, said cap having a closed end, a pin projecting through said closed end, a plunger carried by said pin, a gasket carried by the said plunger adapted to seal the passageway at the free end of said body, a spring between the said closed end of the cap and the said plunger adapted to urge the plunger away from the said closed end, said body and cap including bayonet locking means loading the gasket against the said free end and releasably affixing the cap on said body, and said plunger including a pilot portion projecting into the said passageway when the said cap is operatively positioned on the said body.

References Cited

UNITED STATES PATENTS

| | | | |
|---|---|---|---|
| 554,166 | 2/1896 | Atkinson et al. | 220—40 X |
| 656,201 | 8/1900 | Meredith | 220—40 |
| 1,286,320 | 12/1918 | Hood | 220—38.5 X |
| 1,453,299 | 5/1923 | Wetzel | 220—39 X |
| 2,829,015 | 4/1958 | Holin | 308—79 |
| 2,923,581 | 2/1960 | Wahrenberger et al. | 308—79 |
| 2,956,293 | 10/1960 | McKay et al. | |

FOREIGN PATENTS

| | | |
|---|---|---|
| 378,116 | 9/1907 | France |
| 23,899 | 3/1914 | Great Britain. |
| 177,906 | 9/1935 | Switzerland. |

THERON E. CONDON, *Primary Examiner.*

JAMES R. GARRETT, *Assistant Examiner.*

U.S. Cl. X.R.

220—86, 40, 39